United States Patent [19]

Watanabe et al.

[11] Patent Number: 5,036,404
[45] Date of Patent: Jul. 30, 1991

[54] VIDEO DISC PLAYER COMPRISING CLAMPING CIRCUIT FOR MUSE SIGNAL

[75] Inventors: Hiroshi Watanabe, Gifu; Toshiaki Hioki, Ogaki; Yosihiko Morita, Gifu, all of Japan

[73] Assignee: Sanyo Electric Co., Ltd., Moriguchi, Japan

[21] Appl. No.: 375,306

[22] Filed: Jul. 3, 1989

[30] Foreign Application Priority Data

Jul. 5, 1988 [JP] Japan .................................. 63-167411

[51] Int. Cl.$^5$ .............................................. H04N 5/91
[52] U.S. Cl. ...................................... 358/337; 358/315; 358/322
[58] Field of Search ............... 358/315, 320, 323, 330, 358/337, 339, 316, 318; 360/27, 32, 36.1, 36.2

[56] References Cited

U.S. PATENT DOCUMENTS

| | | | |
|---|---|---|---|
| 3,723,643 | 3/1973 | Suzuki et al. | 360/27 |
| 4,819,086 | 4/1989 | Hayashi et al. | 358/330 |
| 4,916,553 | 10/1990 | Yoshioka et al. | 358/339 |

OTHER PUBLICATIONS

"Broadcasting and Transmission System-Muse", Ninomiya et al, Technical Papers on Third International Colloquium on Advanced Television Systems, HDTV 1987, Ottawa, Canada, Oct. 4-8, 1987.

*Primary Examiner*—Donald McElheny, Jr.
*Attorney, Agent, or Firm*—Armstrong, Nikaido, Marmelstein, Kubovcik & Murray

[57] ABSTRACT

An FM-MUSE signal and a pilot signal are frequency-multiplexed, to be recorded on a video disc (D). In addition, a clamp level signal and an index signal are multiplexed on particular lines of a plurality of lines of the MUSE signal. The index signal is detected from the FM-MUSE signal reproduced from the video disc by a video disc player (100). Pulses of the reproduced pilot signal are counted, beginning at the time of this detection. Accordingly, the timing of generating the clamp level signal is specified, so that clamp pulses are generated. A clamping circuit (5) is provided in the video disc player, so that the clamp level signal is accurately clamped in response to the clamp pulse.

4 Claims, 4 Drawing Sheets

VIDEO DISC PLAYER COMPRISING CLAMPING CIRCUIT FOR MUSE SIGNAL

BACKGROUND OF THE INVENTION

1. Field of the Invention

The present invention relates generally to a video disc player, and more particularly, to a high-definition video disk player containing a clamping circuit for accurately clamping a clamp level signal multiplexed on a MUSE signal reproduced from a video disc at predetermined timing.

2. Description of the Background Art

In recent years, a high-definition video disc player for optically reproducing high-definition video information recorded on a video disc has been developed. In general, a high-definition video signal is subjected to bandwidth compression by a TCI (Time Compressed Integration) multiple sub-nyquist sampling encoding system, i.e., a MUSE converting system, to be recorded on such a video disc. Such a MUSE converting system is described in an article by Y. Ninomiya et al., entitled "BROADCASTING AND TRANSMISSION SYSTEM-MUSE", Technical Papers of Third International Colloquium on Advanced Television systems; HDTV 1987, Ottawa, Canada, Oct. 4–8, 1987. A so-called MUSE signal obtained by such a converting system is suitably used in a transmission system and a recording-/reproducing system of a high-definition video signal.

The MUSE signal thus recorded on the video disc is optically reproduced by the high-definition video disc player and further applied to a MUSE decoder. The MUSE decoder converts the reproduced MUSE signal into a high-definition video signal, to supply the same to a display device for high-definition video, or the like.

According to the standard of the MUSE signal, a clamp level signal is multiplexed on the 563rd horizontal scanning period (line) and the 1125th line in one frame of the MUSE signal so as to define a DC intermediate level of the reproduced MUSE signal. Such a clamp level signal is digitally processed in the MUSE decoder, to be accurately clamped. FIG. 2 is a diagram showing the arrangement corresponding to one frame of the MUSE signal according to the above described standard. The MUSE decoder analog-to-digital converts the reproduced MUSE signal and further separates horizontal synchronizing signals. When the MUSE decoder detects first and second frame synchronizing pulses at the beginning of each frame, the MUSE decoder starts counting of the above described separated horizontal synchronizing signals, generates clamp pulses at the timing of the 563rd line and the 1125th line and accurately clamps the clamp level signal on the above described particular lines, to define the DC intermediate level (128/256) of the reproduced MUSE signal to a predetermined level.

In general, the above described clamping operation is digitally performed in the MUSE decoder. Thus, the video disc player itself does not generally contain such a clamping circuit.

However, when a digital time base corrector (compensation) is provided in the video disc player to attempt to make jitter correction of the reproduced MUSE signal, the following problem occurs because no clamping circuit is provided in the video disc player itself as described above.

More specifically, if the above described clamping operation is performed only in the MUSE decoder in the succeeding stage of the video disc player, a DC level of a MUSE signal entering the video disc player remains unstable. Consequently, a conversion range of an A/D converter in the first stage of the time base corrector must be wider than a range in which the entering signal itself fluctuates because vertical fluctuations in the DC level added to fluctuations of the entering signal itself must be considered, resulting in the decrease in resolution of analog-to-digital conversion.

Accordingly, if a clamping circuit is provided in the video disc player to accurately clamp the entering MUSE signal, fluctuations in the DC level of the entering MUSE signal can be prevented. Thus, the conversion level of the A/D converter in the first stage of the time base corrector need not be increased to a level more than necessary, so that converting efficiency can be increased.

Meanwhile, separation and counting of horizontal synchronizing signals to be a clue to the clamping operation as described above are digitally accomplished in the MUSE decoder. However, such digital processing means is not provided in the video disc player. Thus, there is a problem of the necessity of adding a very complicated circuit in the video disc player so as to perform the clamping operation of the MUSE signal.

SUMMARY OF THE INVENTION

Accordingly, an object of the present invention is to provide a video disc player capable of performing a predetermined clamping operation of a clamp level signal multiplexed on a reproduced MUSE signal without providing any complicated circuit.

Another object of the present invention is to provide a video disc player capable of making high-precision jitter compensation of a reproduced MUSE signal.

Briefly stated, the present invention is directed to a video disc player for optically reproducing high-definition video information recorded on a recording medium. An FM video signal obtained by frequency-modulating a MUSE signal obtained by bandwidth compression of a high-definition video signal using a TCI sub-nyquist sampling encoding system after multiplexing a clamp level signal and a Manchester-coded index signal on particular lines of the MUSE signal, and a pilot signal of a constant frequency are frequency-multiplexed, to be recorded on the recording medium. The video disc player comprises a circuit for reproducing the MUSE signal from the recording medium, a circuit for reproducing the pilot signal from the recording medium, a circuit for detecting the index signal from the reproduced MUSE signal, a circuit for starting counting of pulses of the pilot signal in response to detection of the index signal and generating a clamp pulse when its count value reaches a predetermined count value corresponding to the timing of detecting the clamp level signal, and a circuit for clamping the clamp level signal multiplexed on the reproduced MUSE signal in response to the clamp pulse.

In accordance with another aspect of the present invention, the clamp pulse generating circuit may be adapted to generate clamp pulse after a lapse of a constant time period after the index signal is detected.

Therefore, a principal advantage of the present invention is that the timing of clamping the clamp level signal multiplexed on the reproduced MUSE signal is determined, beginning at the time of detecting the index signal which is indispensable to, for example, make access to the video disc and is easily detected, so that the reproduced MUSE signal can be accurately clamped in the video disc player without providing any complicated circuit.

Another advantage of the present invention is that the timing of clamping the clamp level signal multiplexed on the reproduced MUSE signal can be accurately determined by counting pulses of the reproduced pilot signal, beginning at the time of detecting the index signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The principle of the present invention will be schematically described. Various index signals which are indispensable to access a program such as an address signal, a lead-in signal and a lead-out signal are subjected to Manchester coded processing and then, frequency-modulated, to be recorded on a video disc. A signal obtained by FM (Frequency Modulation)-demodulating the index signal has no DC component and thus, is easily detected. In addition, the index signal and the above described clamp level signal are multiplexed on predetermined lines in any frame of the MUSE signal. Thus, according to the present invention, the timing of generating the clamp level signal is determined, beginning at the timing of detecting the index signal to generate clamp pulses.

Figure 2:
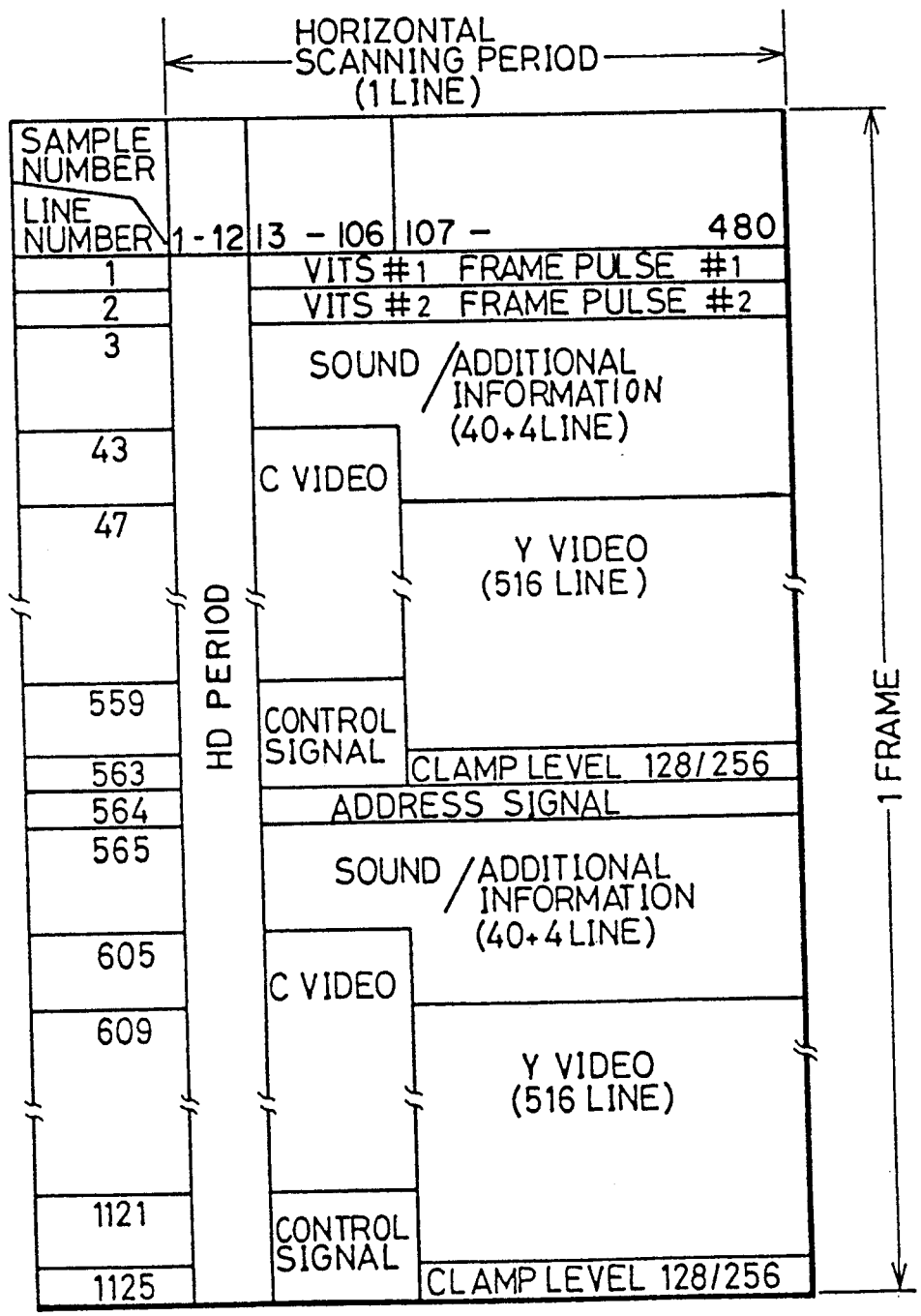
FIG. 2 is a diagram showing the arrangement corresponding to one frame of a MUSE signal according to the standard of the MUSE signal.

Referring to FIG. 2 which is a diagram showing the arrangement of the MUSE signal, the concept of the present invention will be described in detail. A clamp level signal is multiplexed on the 563th line and the 1125th line in each frame. Furthermore, an address signal is multiplexed on the 564th line during a part of a program, a lead-in signal is multiplexed thereon before the start of the program, and a lead-out signal is multiplexed thereon after the end of the program.

Furthermore, each of the above described index signals, which is multiplexed on the 564th line with it being Manchester-coded, comprises 12-bit synchro-pattern data and 20-bit index data and is multiplexed on the 564th line, its DC level being the same as the clamp level.

A MUSE signal having such an index signal multiplex thereon is frequency-modulated and along with a pilot signal of a constant frequency, is frequency-multiplexed, to be recorded on the video disc. In the present embodiment, the MUSE signal to be recorded includes no jitter, and the frequency of the pilot signal is a fixed frequency sufficiently higher than the line frequency of the MUSE signal.

Figure 1:
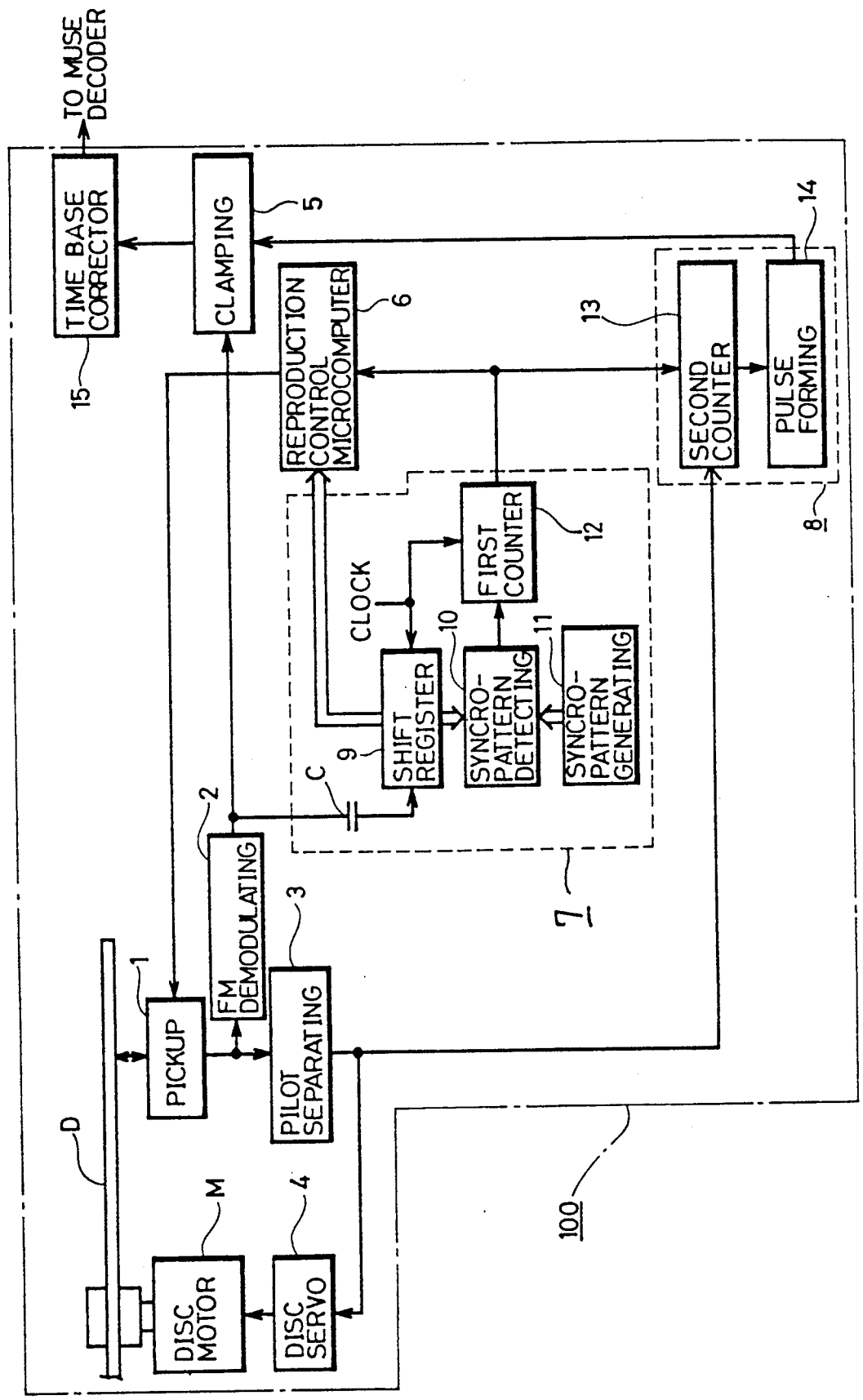
FIG. 1 is a schematic block diagram showing a video disc player according to one embodiment of the present invention.
Figure 3:
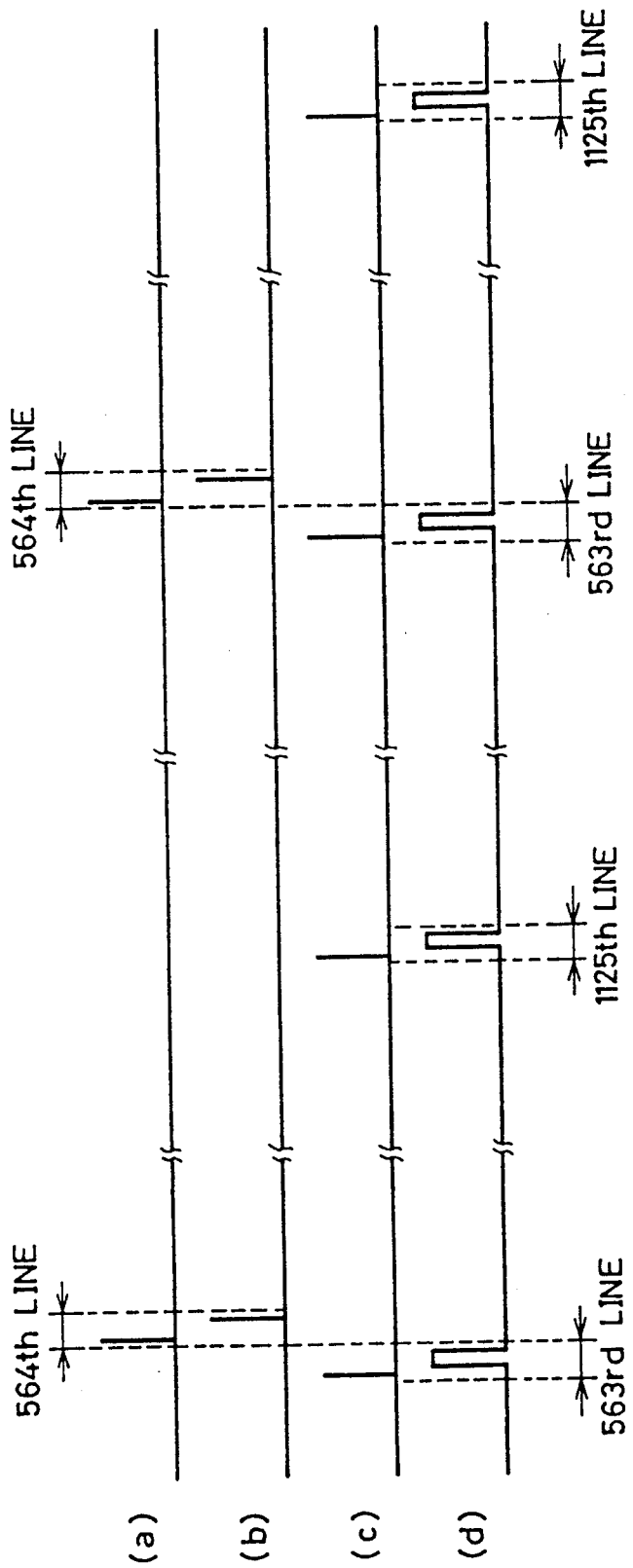
FIG. 3, consisting of (a)-d, is a timing chart for explaining an operation of the video disc player according to the embodiment shown in FIG. 1.

FIG. 1 is a schematic block diagram showing a video disc player according to an embodiment of the present invention, and FIG. 3 is a timing chart for explaining its operation.

In FIG. 1, the above described high-definition video information recorded on a video disc D is optically reproduced by an optical pickup 1, to be applied to an FM demodulating circuit 2 and a pilot signal separating circuit 3. The pilot signal separating circuit 3 extracts a pilot signal from reproduction output of the pickup 1, to apply the same to a disc servo circuit 4. The disc servo circuit 4 accordingly controls the rotation of a disc motor M.

On the other hand, the FM demodulating circuit 2 FM-demodulates an FM-MUSE signal reproduced by the pickup 1, to reproduce a MUSE signal. This reproduced MUSE signal is applied to a clamping circuit 5 and an index reading circuit 7. In this index reading circuit 7, the reproduced MUSE signal applied thereto is applied to a shift register 9 after its DC component is cut by a capacitor C. This shift register 9 receives a clock having a frequency obtained by multiplying the bit frequency of the index signal by a multiplier from a not-shown clock signal source as shift pulses, and has capacity in which a 20-bit index signal can be read in.

The index signal multiplexed on the 564th line of the MUSE signal comprises 12-bit synchro-pattern data and 20-bit index data as described above. During a time period of this line, the synchro-pattern data is first read in the shift register 9. In this case, the synchro-pattern data is inherently 12-bit data of a predetermined pattern. A synchro-pattern generating circuit 11 generates the predetermined pattern of this synchro-pattern data. A synchro-pattern detecting circuit 10 compares the 12-bit synchro-pattern data read in the shift register 9 with the predetermined pattern generated from the synchro-pattern generating circuit 11. If it is confirmed that the read data is the predetermined 12-bit synchro-pattern data, the synchro-pattern detecting circuit 10 generates a synchro-pattern detection output (see FIG. 3 (a)) to apply the same to a first counter 12.

This first counter 12 defines by counting the clocks the time period from the time when a counting operation is started in response to this synchro-pattern detection output to the time when input of the 20-bit index data is completed. When reading of the 20-bit index data in the shift register 9 is completed, the first counter 12 generates a signal indicating completion of data reading (see FIG. 3 (b)). This signal indicating completion of data reading and the index data read in the shift register 9 are applied to a reproduction control microcomputer 6. The reproduction control microcomputer 6 performs control such as an address search in accordance with the applied index data.

On the other hand, the signal indicating completion of data reading outputted from the first counter 12 is applied to a clamp pulse generating circuit 8 as an index detecting signal. In addition, the pilot signal is supplied to the clamp pulse generating circuit 8 from the pilot signal separating circuit 3. This clamp pulse generating circuit 8 comprises a second counter 13. This second counter 13 starts counting of pulses of the reproduced pilot signal in response to the signal indicating completion of data reading. When the reproduced MUSE signal includes jitter, the pilot signal which has been frequency-multiplexed on this MUSE signal should also include jitter equal thereto. Thus, if pulses of such a reproduced pilot signal are counted, the timing which coincides with the timing of the clamp level signal multiplexed on the 563th line and 1125th line in each frame of the reproduced MUSE signal can be detected. More specifically, the second counter 13 detects such timing to generate a count-up output (see FIG. 3 (i c)). This count-up output is applied to a pulse forming circuit 14. This pulse forming circuit 14 generates a high level clamp pulse (see FIG. 3 (d)) during a time period of a clamp level signal detected in response to the count-up of the second counter 13. The clamp pulse is applied to the clamping circuit 5 having the reproduced MUSE signal inputted therein. The clamping circuit 5 accurately clamps the clamp level signal at predetermined timing for each frame. The reproduced MUSE signal outputted from the clamping circuit 5 is further applied to a time base corrector 15, to be subjected to jitter compensation. An output of the time base corrector 15 is applied to a not-shown MUSE decoder as an output of the video disc player.

As described in the foregoing, according to an embodiment of the present invention, the interval between an index signal and a clamp level signal can be accurately detected by counting the reproduced pilot signal even if jitter occurs in the reproduced MUSE signal. Consequently, the clamp level signal can be accurately clamped.

Figure 4:
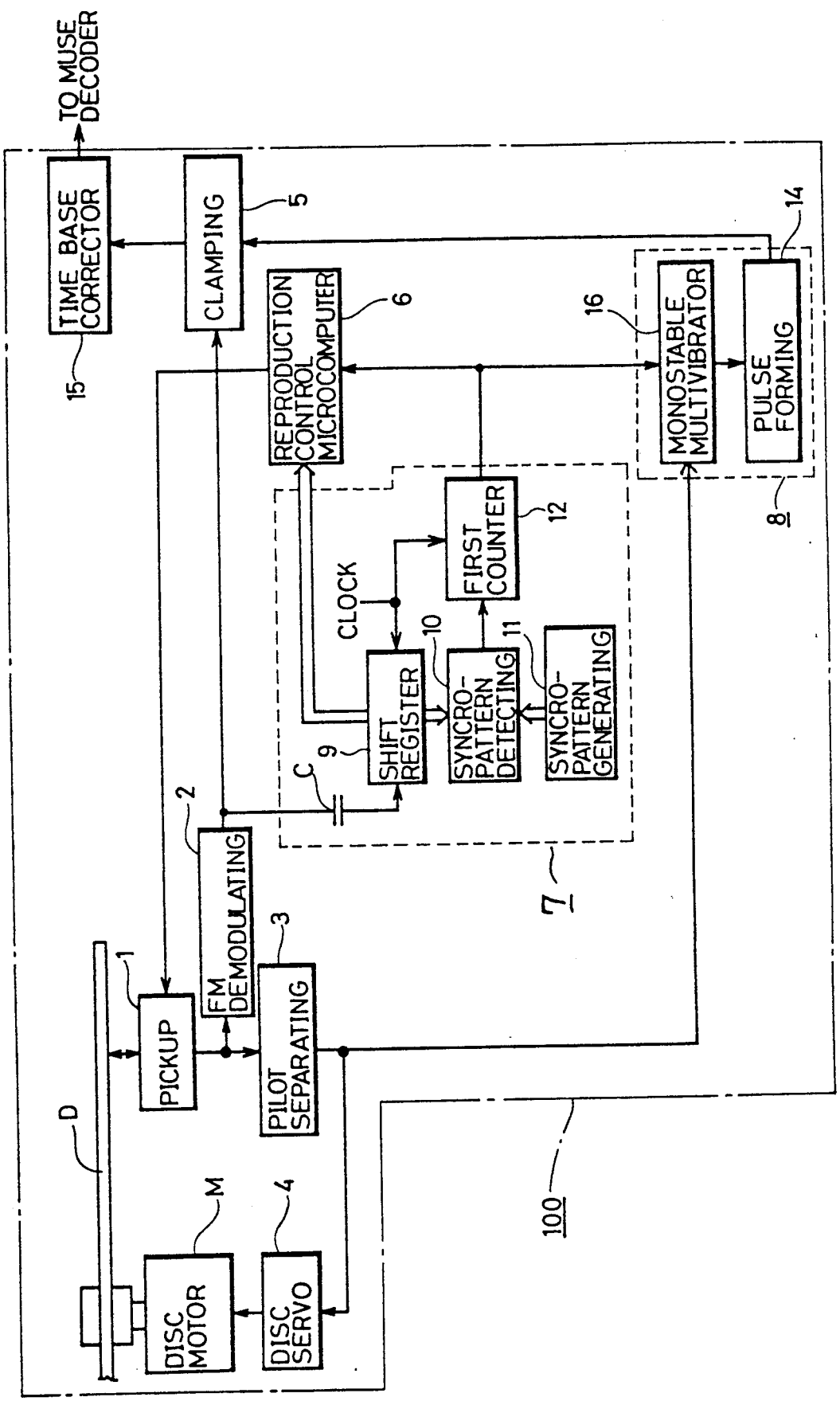
FIG. 4 is a schematic block diagram showing a video disc player according to another embodiment of the present invention.

On the other hand, when the index signal is multiplexed on, for example, the 562nd line and the 1124th line (Y video portion in FIG. 2) in place of the above described 564th line in each frame of the MUSE signal, the interval between the index signal (on the 562nd line and the 1124th line) and the clamp level signal (on the 563rd line and 1125th line) becomes substantially short. Thus, even if jitter slightly occurs in the reproduced MUSE signal, the clamp level signal can be clamped at correct timing provided clamp pulses are generated at timing delayed from the timing of the above described index detecting signal by a constant time period. Thus, as shown in FIG. 4, a monostable multivibrator 16 may be provided in place of the second counter 13 shown in FIG. 1 to drive the pulse forming circuit 14 after a lapse of a constant time period after an index detection output from the first counter 12 is applied thereto, in which case the clamp level signal can be clamped considerably accurately. In addition, pulses of a reference clock of a constant frequency may be counted by the second counter 13 shown in FIG. 1, to obtain the same effect.

Although in the above described embodiment, the signal indicating completion of data reading is utilized as an index detecting signal, the synchro-pattern data itself may be used as an index detecting signal, to obtain the same effect.

As described in the foregoing, according to one embodiment of the present invention, pulses of the reproduced pilot signal including jitter equal to the jitter in the reproduced MUSE signal are counted, beginning at the index signal which can be easily detected to determine the timing of generating clamp pulses. Thus, the clamp level signal multiplexed on the reproduced MUSE signal can be accurately clamped in the video disc player.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video disc player for optically reproducing high definition video information recorded on a recording medium (D), an FM video signal obtained by frequency-modulating a MUSE signal obtained by bandwidth compression of a high-definition video signal using a TCI (Time Compressed Integration)multiple sub-nyquist sampling encoding system after multiplexing a clamp level signal and a Manchester-coded index signal on particular lines of the MUSE signal, and a pilot signal of a constant frequency being frequency-multiplexed, to be recorded on said recording medium, said video disc player comprising:
   means (2) for reproducing said MUSE signal from said recording medium,
   means (3) for reproducing said pilot signal from said recording medium,
   means (7) for detecting said index signal from said reproduced MUSE signal,
   means (8) for starting counting of pulses of said pilot signal in response to detection of said index signal and generating a clamp pulse when its count value reaches a predetermined count value corresponding to the timing of detecting said clamp level signal, and
   means (5) for clamping said clamp level signal multiplexed on said reproduced MUSE signal in response to said clamp pulse.

2. The video disc player according to claim 1, which further comprises time base corrector means (15) for making jitter compensation of said reproduced MUSE signal having said clamp level signal clamped by said clamping means multiplexed thereon.

3. A video disc player for optically reproducing high-definition video information recorded on a recording medium (D), an FM video signal obtained by frequency-modulating a MUSE signal obtained by bandwidth compression of a high-definition video signal using a TCI multiple sub-nyquist sampling encoding system after multiplexing of a clamp level signal and a Manchester-coded index signal on particular lines of the MUSE signal being recorded on said recording medium, said video disc player comprising:
   means (2) for reproducing said MUSE signal from said recording medium
   means (7) for detecting said index signal from said reproduced MUSE signal,
   means (16) for measuring a constant time period in response to detection of said index signal and generating a clamp pulse after a lapse of said constant time period, and
   means (5) for clamping said clamp level signal multiplexed on said reproduced MUSE signal in response to said clamp pulse.

4. The video disc player according to claim 3, which further comprises time base corrector means (15) for making jitter compensation of said reproduced MUSE signal having said clamp level signal clamped by said clamping means multiplexed thereon.

* * * * *